US012438285B2

(12) United States Patent
Zhong

(10) Patent No.: US 12,438,285 B2
(45) Date of Patent: Oct. 7, 2025

(54) ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Yongwei Zhong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 146 days.

(21) Appl. No.: 18/494,668

(22) Filed: Oct. 25, 2023

(65) Prior Publication Data

US 2024/0055775 A1 Feb. 15, 2024

Related U.S. Application Data

(63) Continuation of application No. PCT/CN2022/083885, filed on Mar. 30, 2022.

(30) Foreign Application Priority Data

Jun. 21, 2021 (CN) ........................ 202110687580.6

(51) Int. Cl.
*H01Q 21/24* (2006.01)
*H01Q 1/38* (2006.01)

(52) U.S. Cl.
CPC ............... *H01Q 21/24* (2013.01); *H01Q 1/38* (2013.01)

(58) Field of Classification Search
CPC .......... H01Q 21/24; H01Q 1/38; H01Q 21/08; H01Q 21/205; H01Q 1/243; H01Q 21/00
See application file for complete search history.

(56) References Cited

U.S. PATENT DOCUMENTS 9,905,922 B2 * 2/2018 Lee ........................ H01Q 1/243
12,149,000 B2 * 11/2024 Park ........................ H01Q 21/28
2020/0119453 A1 * 4/2020 Takayama ............. H01Q 1/243
(Continued)

FOREIGN PATENT DOCUMENTS

CN 103367917 A 10/2013
CN 103493292 A 1/2014
(Continued)

OTHER PUBLICATIONS

International Search Report, International Application No. PCT/CN2022/083885, mailed Jun. 16, 2022 with English translation provided by WIPO.
(Continued)

*Primary Examiner* — Seung H Lee
(74) *Attorney, Agent, or Firm* — Ladas & Parry, LLP

(57) ABSTRACT

An antenna apparatus and an electronic device. The antenna apparatus includes a dielectric substrate, a first antenna array and a second antenna array. An extension direction of a second sub-substrate of the dielectric substrate intersects with an extension direction of a first sub-substrate of the dielectric substrate. The first antenna array is arranged on the first sub-substrate; the second antenna array is arranged on the second sub-substrate; the first antenna array has a first radiation direction; the second antenna array has a second radiation direction; and the second radiation direction is different from the first radiation direction.

12 Claims, 7 Drawing Sheets

(56) References Cited

U.S. PATENT DOCUMENTS

| | | | | |
|---|---|---|---|---|
| 2021/0151874 A1* | 5/2021 | Sudo | .................... | H01Q 21/065 |
| 2021/0280959 A1* | 9/2021 | Han | ......................... | H01Q 1/36 |

FOREIGN PATENT DOCUMENTS

| | | | |
|---|---|---|---|
| CN | 108376828 | A | 8/2018 |
| CN | 108448230 | A | 8/2018 |
| CN | 208589528 | U | 3/2019 |
| CN | 110021815 | A | 7/2019 |
| CN | 209472106 | U | 10/2019 |
| CN | 111430884 | A | 7/2020 |
| CN | 112151938 | A | 12/2020 |
| WO | 2022267597 | A1 | 12/2022 |

OTHER PUBLICATIONS

Written Opinion of the International Searching Authority in International Application No. PCT/CN2022/083885, mailed Jun. 16, 2022, with machine English translation provided by WIPO and by applicant's foreign counsel.

Chinese First Office Action, Chinese Application No. 202110687580.6, mailed Nov. 13, 2024, with search report (11 pages).

Chinese Second Office Action from corresponding Chinese patent Application No. 202110687580.6, mailed Mar. 22, 2025.

Chinese Rejection decision from corresponding Chinese patent Application No. 202110687580.6, mailed Apr. 23, 2025.

* cited by examiner

ANTENNA APPARATUS AND ELECTRONIC DEVICE

CROSS-REFERENCE TO RELATED APPLICATIONS

This application is a continuation of International Patent Application No. PCT/CN2022/083885, filed Mar. 30, 2022, which claims the priority of Chinese Patent Application No. 202110687580.6, filed Jun. 21, 2021, both of which are herein incorporated by reference in their entirety.

TECHNICAL FIELD

The present disclosure relates to the field of communication technologies, and in particular, to an antenna apparatus and an electronic device.

BACKGROUND

With the development of communication technology, an electronic device such as a smartphone is able to realize more and more functions, and communication modes of the electronic device have become more diverse. It is understandable that each communication mode of the electronic device requires a corresponding antenna for support.

SUMMARY OF THE DISCLOSURE

In a first aspect, the present disclosure provides an antenna apparatus. The antenna apparatus includes a dielectric substrate, a first antenna array and a second antenna array. The dielectric substrate includes a first sub-substrate and a second sub-substrate connected to each other, and an extension direction of the second sub-substrate intersects with an extension direction of the first sub-substrate. The first antenna array is arranged on the first sub-substrate. A feed point is provided on the first antenna array. The feed point is configured to be electrically connected with a feed source. The first antenna array has a first radiation direction. The second antenna array is arranged on the second sub-substrate. The second antenna array has a second radiation direction, and the second radiation direction is different from the first radiation direction.

In a second aspect, the present disclosure provides an electronic device. The electronic device includes an antenna apparatus. The antenna apparatus includes a dielectric substrate, a first antenna array and a second antenna array. The dielectric substrate includes a first sub-substrate and a second sub-substrate connected to each other, and an extension direction of the second sub-substrate intersects with an extension direction of the first sub-substrate. The first antenna array is arranged on the first sub-substrate. A feed point is provided on the first antenna array. The feed point is configured to be electrically connected with a feed source. The first antenna array has a first radiation direction. The second antenna array is arranged on the second sub-substrate. The second antenna array has a second radiation direction, and the second radiation direction is different from the first radiation direction.

In a third aspect, the present disclosure provides an electronic device. The electronic device includes an antenna apparatus and a circuit board, The antenna apparatus includes a dielectric substrate, a first antenna array and a second antenna array. The dielectric substrate includes a first sub-substrate and a second sub-substrate connected to each other, and an extension direction of the second sub-substrate intersects with an extension direction of the first sub-substrate. The first antenna array is arranged on the first sub-substrate. A feed point is provided on the first antenna array. The feed point is configured to be electrically connected with a feed source. The first antenna array has a first radiation direction. The second antenna array is arranged on the second sub-substrate. The second antenna array has a second radiation direction, and the second radiation direction is different from the first radiation direction. The circuit board includes a first surface and a second surface connected to each other, an extension direction of the second surface intersects with an extension direction of the first surface, the first sub-substrate is connected to the first surface, and the second sub-substrate is connected to the second surface.

BRIEF DESCRIPTION OF THE DRAWINGS

In order to explain the technical solutions in the embodiments of the present disclosure more clearly, the drawings needed to be used in the description of the embodiments will be briefly introduced below. Obviously, the drawings in the following description are only some embodiments of the present disclosure. For those skilled in the art, other drawings may be obtained based on these drawings without exerting creative efforts.

DETAILED DESCRIPTION

The technical solutions in the embodiments of the present disclosure will be clearly and completely described below with reference to FIG. 1 to FIG. 16 in the embodiments of the present disclosure. Obviously, the described embodiments are only some of the embodiments of the present disclosure, but not all of them. Based on the embodiments in the present disclosure, all other embodiments obtained by those skilled in the art without making creative efforts fall within the protection scope of the present disclosure.

The embodiments of the present disclosure provide an antenna apparatus and an electronic device. The antenna apparatus may realize a wireless communication function of the electronic device. For example, the antenna apparatus may transmit Wi-Fi signals, global positioning system (GPS) signals, third-generation mobile communication technology (3th-Generation, referred to as 3G), fourth-generation mobile communication technology (4th-Generation, referred to as 4G), fifth-generation mobile communication technology (5th-Generation, referred to as 5G), near field communication (NFC) signals, Bluetooth (BT) signals, ultra wide band (UWB) signals etc. The electronic device may be a device such as a smartphone or a tablet, or it may be a game device, an augmented reality (AR) device, an automotive device, a data storage device, an audio playback device, a video playback device, a laptop, and a desktop computing device, etc.

Figure 1:
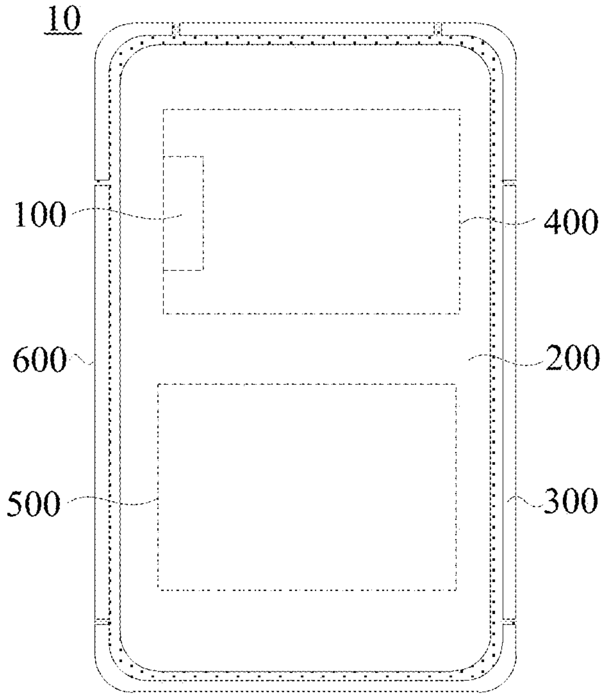
FIG. 1 is a first structural schematic view of an electronic device provided by an embodiment of the present disclosure.

As shown in FIG. 1, which is a first structural schematic view of an electronic device provided by an embodiment of the present disclosure. The electronic device 10 may include an antenna apparatus 100, a display screen 200, a middle frame 300, a circuit board 400, a battery 500, and a back shell 600.

The display screen 200 may be installed on the middle frame 300 and connected to the back shell 600 through the middle frame 300 to form a display surface of the electronic device 10. The display screen 200 is configured to display information such as images, text, etc. The display screen 200 may include a liquid crystal display (LCD) or an organic light-emitting diode (OLED) display. The display screen 200 may be a full-screen display screen or a non-full-screen display screen.

The middle frame 300 may include a frame (not shown in the drawings) and a carrier plate (not shown in the drawings). The carrier plate may provide support for electronic components or electronic elements in the electronic device 10. The frame is connected to an edge of the carrier plate and protrudes from the carrier plate. The frame may form a side wall of the electronic device. The frame and the carrier plate form an accommodation space in which electronic components and electronic elements in the electronic device 10 may be installed and fixed.

The circuit board 400 is disposed on the middle frame 300, and the circuit board 400 may be connected to the middle frame 300 so as to be fixed. The circuit board 400 may be integrated with a processor, and may also be integrated with one or more functional components such as a headphone jack, an acceleration sensor, a gyroscope, and a motor. Besides, the circuit board 400 may be electrically connected to the display screen 200 to control the display of the display screen 200 through the processor on the circuit board 400.

The battery 500 is disposed on the middle frame 300, and the battery 500 may be connected to the middle frame 300 so as to be fixed. The battery 500 may be electrically connected to the circuit board 400 such that the battery 500 may supply power to the electronic device 10. The circuit board 400 may be provided with a power management circuit. The power management circuit is configured to distribute voltage provided by the battery 500 to various electronic elements in the electronic device 10.

The back shell 600 may be connected with the middle frame 300. The back shell 600, together with the middle frame 300 and the display screen 200, may seal the electronic elements and functional components of the electronic device 10 inside the electronic device 10, so as to protect the electronic elements and functional components of the electronic device 10.

Figure 2:
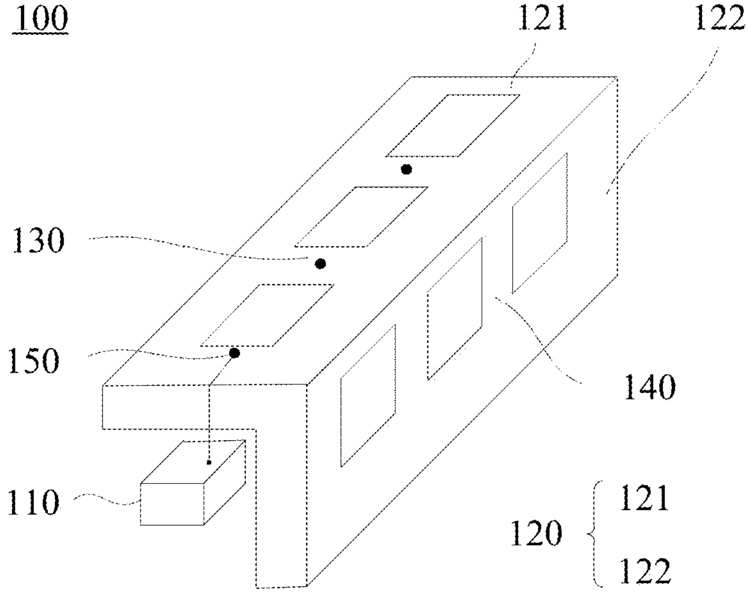
FIG. 2 is a first structural schematic view of an antenna apparatus provided by an embodiment of the present disclosure.
Figure 3:
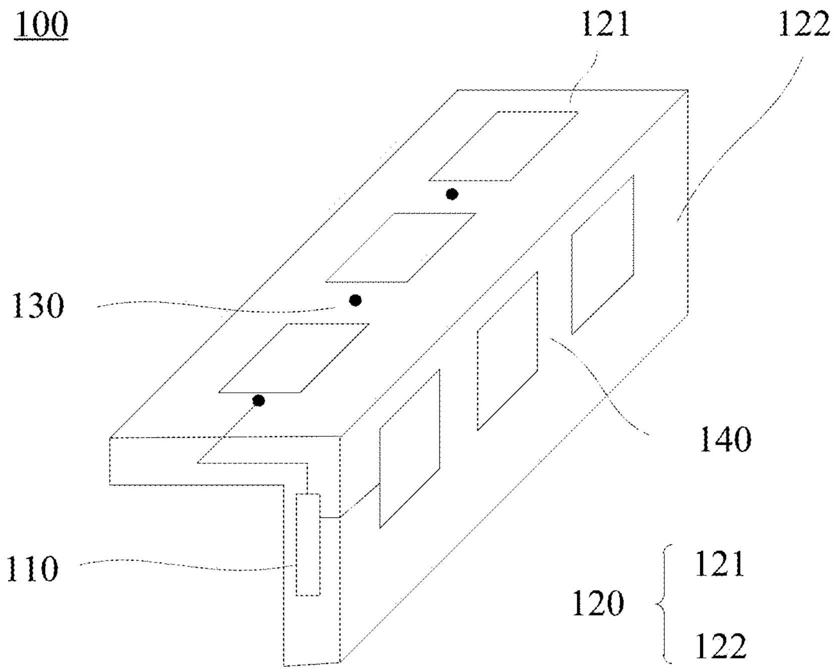
FIG. 3 is a schematic view of a connection of a feed source shown in FIG. 2.

The antenna apparatus 100 may be, but is not limited to, connected to the circuit board 400, small board, or mainboard of the electronic device 10. As shown in FIGS. 2 and 3, FIG. 2 is a first structural schematic view of an antenna apparatus provided by an embodiment of the present disclosure, and FIG. 3 is a schematic view of a connection of a feed source shown in FIG. 2. The antenna apparatus 100 may include a feed source 110, a dielectric substrate 120, a first antenna array 130 and a second antenna array 140.

As shown in FIG. 3, the feed source 110 may be disposed on the dielectric substrate 120. In this case, a distance between the feed source 110 and the first antenna array 130 and the second antenna array 140 disposed on the dielectric substrate 120 is relatively close, which facilitates the design of the wiring of the feed source 110.

As shown in FIG. 2, the feed source 110 may not be disposed on the dielectric substrate 120. For example, the feed source 110 may be disposed on a mainboard of the antenna apparatus 100, and the feed source may also be disposed on the circuit board 400 of the electronic device 10. The embodiments of the present disclosure do not limit the specific location of the feed source 110.

The feed source 110 may be directly or indirectly electrically connected to the first antenna array 130, and the feed source 110 may provide an excitation signal to excite the first antenna array 130 to transmit a first wireless signal. The feed source 110 may also be directly or indirectly electrically connected to the second antenna array 140 to stimulate the second antenna array 140 to transmit a second wireless signal.

The feed source 110 may be directly or indirectly electrically connected to the first antenna array 130 and the second antenna array 140 through a conductive connector such as a metal wiring, a feed network, a metal plated through hole, etc.

The feed source 110 may also be coupled to the first antenna array 130 and the second antenna array 140 to feed the excitation signal to the first antenna array 130 and the second antenna array 140. The feed source 110 may also be directly or indirectly electrically connected to the first antenna array 130 to excite the first antenna array 130 to transmit the first wireless signal. In this case, the second antenna array 140 may be electrically connected to the first antenna array 130 or be connected by coupling feed to enable the second antenna array 140 to transmit the second wireless signal.

The embodiments of the present disclosure do not limit the specific electrical connection relationship between the feed source 110, the first antenna array 130 and the second antenna array 140.

The dielectric substrate 120 may include a first sub-substrate 121 and a second sub-substrate 122 connected to each other. An extension direction of the second sub-substrate 122 may intersect with an extension direction of the first sub-substrate 121, such that the second sub-substrate 122 and the first sub-substrate 121 are on different planes.

The first sub-substrate 121 and the second sub-substrate 122 may form an angle of 90 degrees or approximately 90 degrees. In this case, on a cross-section of the dielectric substrate 120, the first sub-substrate 121 and the second sub-substrate 121 may be L-shaped or close to L-shaped.

The first sub-substrate 121 and the second sub-substrate 122 may also form other angles, such as an acute angle or an obtuse angle. The embodiments of the present disclosure do not limit the specific connection method of the first sub-substrate 121 and the second sub-substrate 122.

The first sub-substrate 121 may carry the first antenna array 130, and the first antenna array 130 may be disposed on the first sub-substrate 121. For example, the first antenna array 130 may be disposed on an upper surface of the first substrate 121. The first antenna array 130 may be provided with a feed point 150, and the feed point 150 may be electrically connected to the feed source 110, such that the first antenna array 130 may be electrically connected to the feed source 110 through the feed point 150 to transmit a first wireless signal.

The feed point 150 may be a feed pad or a feed ball. The feed point 150 and the first antenna array 130 may be disposed oppositely on two sides of the first sub-substrate 121. For example, the feed point 150 may be disposed on a lower surface of the first sub-substrate 121.

The second sub-substrate 122 may carry the second antenna array 140, and the second antenna array 140 may be disposed on the second sub-substrate 122. For example, the second antenna array 140 may be disposed on an outer side of the second sub-substrate 122. The second antenna array 140 may also be electrically connected to the feed source 110 to transmit the second wireless signal.

A feed point may also be provided on the second antenna array 140, so as to be electrically connected to the feed source 110 through the feed point. The second antenna array 140 may also be electrically connected to the feed source 110 through coupling feed.

The second antenna array 140 may also share the feed point 150 with the first antenna array 130, so as to be electrically connected to the feed source 110 through the feed point 150.

Figure 4:
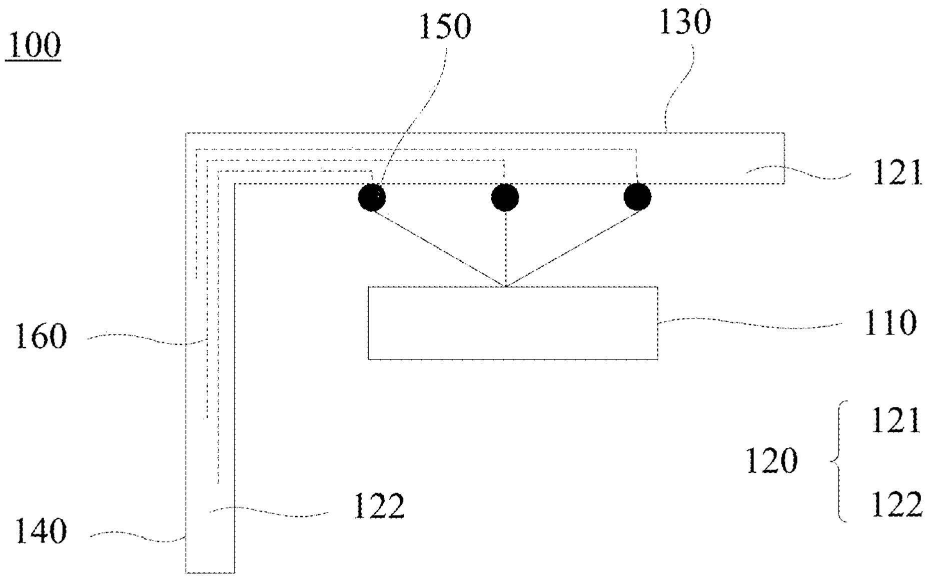
FIG. 4 is a schematic view of an electrical connection of the antenna apparatus shown in FIG. 2.

For example, as shown in FIG. 4, which is a schematic view of an electrical connection of the antenna apparatus shown in FIG. 2. The second antenna array 140 may be connected to the feed point 150 through a first feed network 160. The first feed network 160 may be bent and extended from the second sub-substrate 122 toward the first sub-substrate 121. The second antenna array 140 is connected to the feed source 110 through the first feed network 160 and the feed point 150 and transmits the second wireless signal.

In the antenna apparatus 100 of the embodiments of the present disclosure, the feed point 150 is provided on the first sub-substrate 121, and the second antenna array 140 provided on the second sub-substrate 122 is connected to the feed source 110 through the feed point 150, such that there is no need to arrange the feed point 150 on the second sub-substrate 122, which may reduce the difficulty of connecting the second antenna array 140 to the feed source 110.

The first wireless signal and the second wireless signal may be wireless signals in the same frequency band. The first wireless signal and the second wireless signal may also be wireless signals in different frequency bands. The embodiments of the present disclosure do not limit this.

The first antenna array 130 and the second antenna array 140 may be millimeter wave antenna arrays. According to the provisions of the 5GPP TS 38.103 (5th Generation Partnership Project) agreement, the 5th generation mobile networks (referred to as 5G) mainly adopts two frequency bands: FR1 frequency band and FR2 frequency band. A frequency range of the FR1 band is 450 MHz 6 GHz, also called the sub-6 GHz band; a frequency range of the FR2 band is 24.25 GHz 52.6 GHz, usually called millimeter wave (mm Wave). 3GPP Release 15 standardizes current 5G millimeter wave frequency bands: N257 (26.5-29.5 GHz), N258 (24.25-27.5 GHz), N261 (27.5-28.35 GHz) and N260 (37-40 GHz).

The wavelength range corresponding to the above-mentioned millimeter waves is 1 mm~10 mm. Since the wavelength of millimeter waves is short, they are easily being obstructed during transmission. Therefore, both the first antenna array 130 and the second antenna array 140 may include a plurality of millimeter wave antenna units arranged in an array.

When the first antenna array 130 includes the plurality of millimeter wave antenna units arranged in an array, the number of the feed point 150 may be multiple, so as to facilitate integration with the plurality of millimeter wave antenna units of the first antenna array 130 one by one, which allows one millimeter wave antenna unit to be connected to one feed point 150.

When the second antenna array 140 is connected to the feed point 150 through the first feed network 160, each millimeter wave antenna unit on the second antenna array 140 may be connected to one feed point 150 through one corresponding feeder on the first feed network 160. Each millimeter-wave antenna unit on the second antenna array 140 may also be connected to one millimeter-wave antenna unit on the first antenna array 130 through one corresponding feeder on the first feed network 160, such that one millimeter wave antenna unit on the first antenna array 130 is indirectly connected to one feed point 150.

The antenna apparatus 100 of the embodiments of the present disclosure effectively enhances transmission performance of the first antenna array 130 and the second antenna array 140 by arranging multiple millimeter wave antenna units at intervals. By arranging multiple millimeter wave antenna units on the dielectric substrate 120, transmission requirements of 5G millimeter wave band of the first antenna array 130 and the second antenna array 140 may be met. The "transmission" mentioned above for transmitting wireless signals includes receiving wireless signals, transmitting wireless signals, and receiving and transmitting wireless signals simultaneously.

Figure 5:
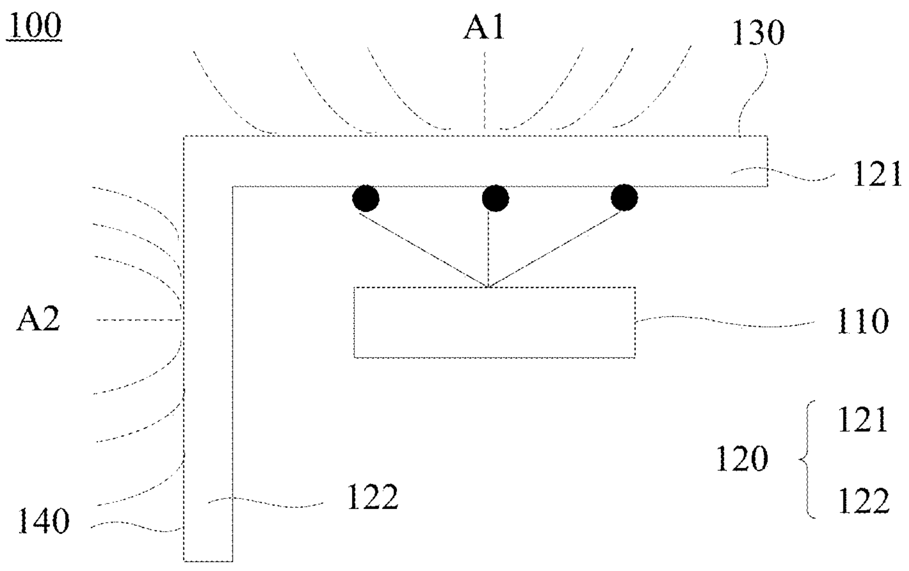
FIG. 5 is a schematic view of a radiation direction of the antenna apparatus shown in FIG. 2.

As shown in FIG. 2 and FIG. 5, FIG. 5 is a schematic view of a radiation direction of the antenna apparatus shown in FIG. 2. When the first antenna array 130 is electrically connected to the feed source 110 and transmits the first wireless signal, the first antenna array 130 may have a first radiation direction A1. The first radiation direction A1 may be an outward extension direction of the first sub-substrate 121 of the dielectric substrate 120, the outward side of the first sub-substrate 121 may form a first radiation area. Similarly, when the second antenna array 140 is electrically connected to the feed source 110 and transmits the second wireless signal, the second antenna array 140 may have a second radiation direction A2. The second radiation direction A2 may be may be an outward extension direction of the second sub-substrate 122 of the dielectric substrate 120, the outward side of the second sub-substrate 122 may form a second radiation area.

The first radiation direction A1 may be a main radiation direction of the first antenna array 130, and the second radiation direction A2 may be a main radiation direction of the second antenna array 140.

Since the extension direction of the first sub-substrate 121 intersects with the extension direction of the second sub-substrate 122, most of the first radiation area and most of the second radiation area do not overlap, and the first radiation direction A1 of the first antenna array 130 is different from the second radiation direction A2 of the second antenna array 140.

In the electronic device 10 and the antenna apparatus 100 in the embodiments of the present disclosure, the first antenna array 130 is disposed on the first sub-substrate 121 of the dielectric substrate 120, the second antenna array 140 is disposed on the second sub-substrate 122 of the dielectric substrate 120, and the first antenna array 130 and the second antenna array 140 are electrically connected to the feed source 110, such that the first antenna array 130 has the first radiation direction A1, the second antenna array 140 has the second radiation direction A2. The second radiation direction A2 is different from the first radiation direction A1. Based on this, the antenna apparatus 100 of the embodiments of the present disclosure, on the one hand, has two different radiation directions, allowing the antenna apparatus 100 to cover a wider signal direction and the radiation performance of the antenna apparatus 100 being better. On the other hand, the extension direction of the first sub-substrate 121 intersects with the extension direction of the second sub-substrate 122, thus the dielectric substrate 120, the first antenna array 130 and the second antenna array 140 may form a special-shaped antenna. The special-shaped antenna may be designed based on the circuit board of the electronic device 10, such that the special-shaped antenna does not require improvement of the circuit board 400 of the electronic device 10, and the special-shaped antenna has better adaptability. Moreover, as the second antenna array 140 is disposed on the first sub-substrate 121 interconnected with the second sub-substrate 122, the second antenna array 140 may be fixed on an installation object through the second sub-substrate 122 and the first sub-substrate 121, which may reduce installation difficulty of the second antenna array 140.

Figure 6:
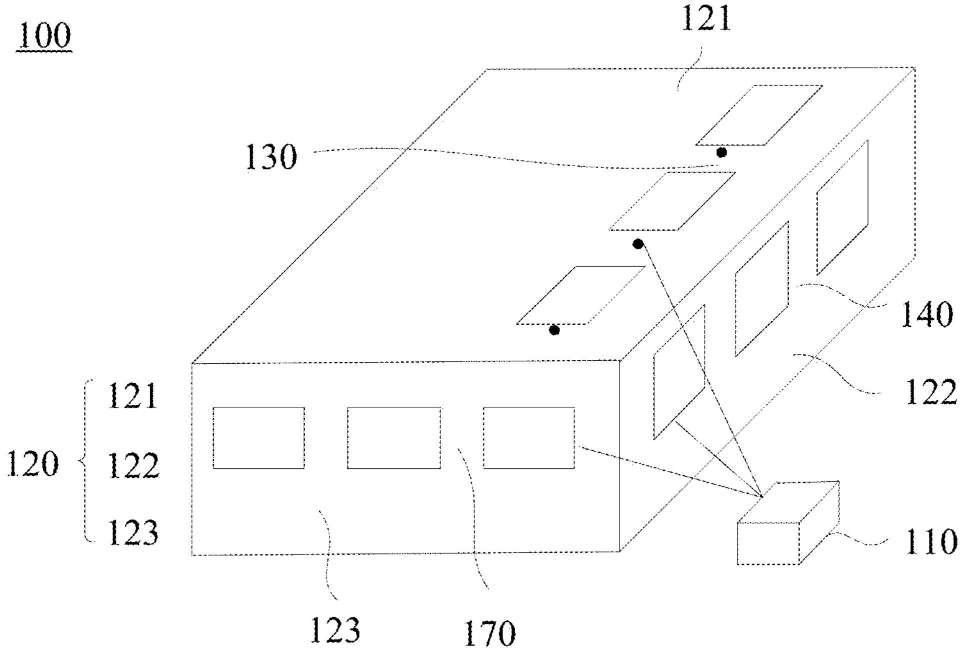
FIG. 6 is a second structural schematic view of an antenna apparatus provided by an embodiment of the present disclosure.
Figure 7:
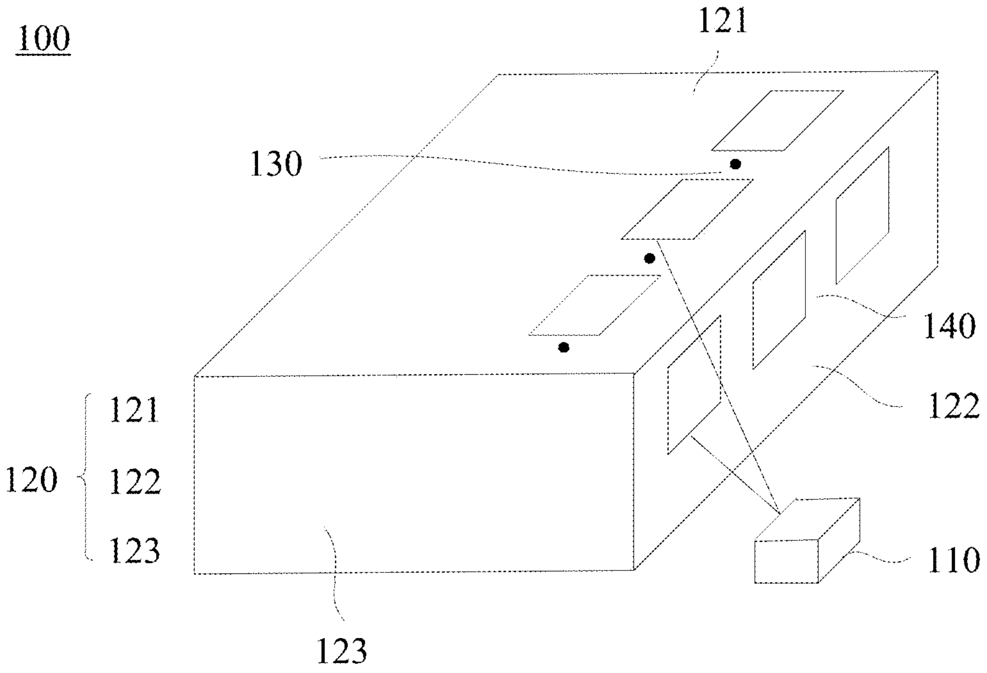
FIG. 7 is a third structural schematic view of an antenna apparatus provided by an embodiment of the present disclosure.

As shown in FIG. 6 and FIG. 7, FIG. 6 is a second structural schematic view of an antenna apparatus provided by an embodiment of the present disclosure, and FIG. 7 is a third structural schematic view of an antenna apparatus provided by an embodiment of the present disclosure. In addition to the first sub-substrate 121 and the second sub-substrate 122, the dielectric substrate 120 may also include one or more third sub-substrates 123. Correspondingly, the antenna apparatus 100 may also include a third antenna array 170, in addition to the first antenna array 130 and the second antenna array 140.

An extension direction of each third sub-substrate 123 may intersect with the extension direction of the first sub-substrate 121 or the extension direction of the second sub-substrate 122. Therefore, any third sub-substrate 123 is not coplanar with the first sub-substrate 121 or the second sub-substrate 122.

As shown in FIG. 6 and FIG. 7, when the third sub-substrate 123 is perpendicular or approximately perpendicular to the first sub-substrate 121 and the second sub-substrate 122, the first sub-substrate 121, the second sub-substrate 122 and the third sub-substrate 123 may form an X-Y-Z coordinate system.

The third sub-substrate 123 may not be perpendicular to the first sub-substrate 121 and the second sub-substrate 122. For example, an angle between the third sub-substrate 123 and the first sub-substrate 121 and the second sub-substrate 122 may be an acute or an obtuse angle. The embodiments of the present disclosure do not limit the specific positional relationship between the third sub-substrate 123, the first sub-substrate 121, and the second sub-substrate 122. As long as the extension direction of the third sub-substrate 123 intersects with the extension direction of the first sub-substrate 121, the solutions are all within the protection scope of the present disclosure.

The first sub-substrate 121 and the second sub-substrate 122 of the dielectric substrate 120 may be integrally formed together. The first sub-substrate 121, the second sub-substrate 122, and one or more third sub-substrates 123 may also be integrally formed together.

The number of the third antenna array 170 may not be greater than the number of one or more third sub-substrates 123, and each third antenna array 170 may be disposed on one third sub-substrate 123.

As shown in FIG. 6, when the number of the third antenna array 170 is one or more and equal to the number of the third sub-substrate 123, one third antenna array 170 may correspond to one third sub-substrate 12, and each third antenna array 170 may be disposed on each third sub-substrate 123.

For another example, as shown in FIG. 7, when the number of the third sub-substrate 123 is one, the number of the third antenna array 170 may be less than the number of the third sub-substrate 123 and may be zero. In this case, the antenna apparatus 100 may not include the third antenna array 170. In other words, the third antenna array 170 may not be provided on the third sub-substrate 123, and the third sub-substrate 123 may be used as a wiring flexible board to realize the electrical connection between the feed point 150 and the feed source 110.

In the antenna apparatus 100 of the embodiments of the present disclosure, when the number of sub-substrates included in the dielectric substrate 120 is greater than the number of antenna arrays, some sub-substrates of the dielectric substrate 120 may not be provided with antenna arrays. The sub-substrates on the dielectric substrate 120 that are not provided with antenna arrays may play a role in assembling, providing a feed network, etc.

The specific number of the third antenna array 170 and the third sub-substrate 123 in the embodiments of the present disclosure are not limited to the above examples, and the embodiments of the present disclosure do not specifically limit this.

Figure 8:
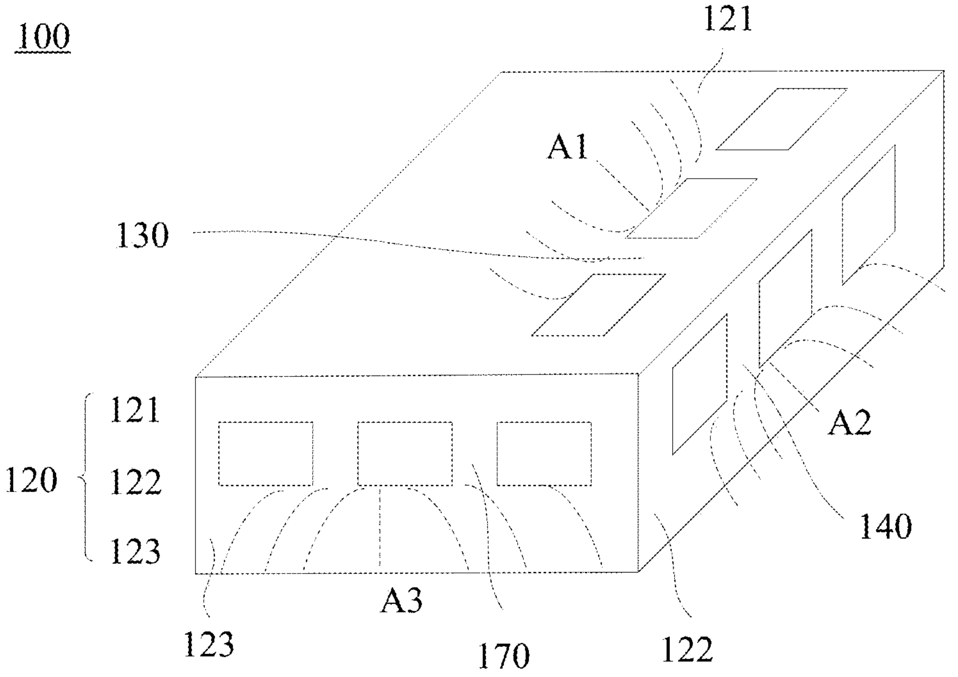
FIG. 8 is a schematic view of a radiation direction of the antenna apparatus shown in FIG. 6.

As shown in FIG. 8 in combination with FIG. 6, FIG. 8 is a schematic view of a radiation direction of the antenna apparatus shown in FIG. 6. When the third antenna array 170 of the antenna apparatus 100 is disposed on the third sub-substrate 123, the third antenna array 170 may be directly or indirectly electrically connected to the feed source 110, or the third antenna array 170 may also be connected to the feed source 110 through a coupling way to realize feeding, or the third antenna array 170 may also be coupled and connected with the first antenna array 130 or the second antenna array 140 to realize feeding, such that the third antenna array 170 may transmit the third wireless signal and have a third radiation direction A3.

The third radiation direction A3 may be an outward extension direction of the third sub-substrate 123 of the dielectric substrate 120, which may form a third radiation area. The third radiation direction A3 may be a main radiation direction of the third antenna array 170.

Since the extension direction of the third sub-substrate 123 intersects with the extension directions of the first sub-substrate 121 and the second sub-substrate 122, most of the third radiation area and the first radiation area and the second radiation area do not overlap. The third radiation direction A3 of the third antenna array 170 is different from the first radiation direction A1 of the first antenna array 130 and the second radiation direction A2 of the second antenna array 140.

The antenna apparatus 100 of the embodiments of the present disclosure includes the first antenna array 130 with the first radiation direction A1, the second antenna array 140 with the second radiation direction A2, and the third antenna array 170 with the third radiation direction A3. The antenna apparatus 100 includes three different radiation directions. The antenna apparatus 100 covers a wider signal direction, which may improve the radiation performance of the antenna apparatus 100.

Figure 9:
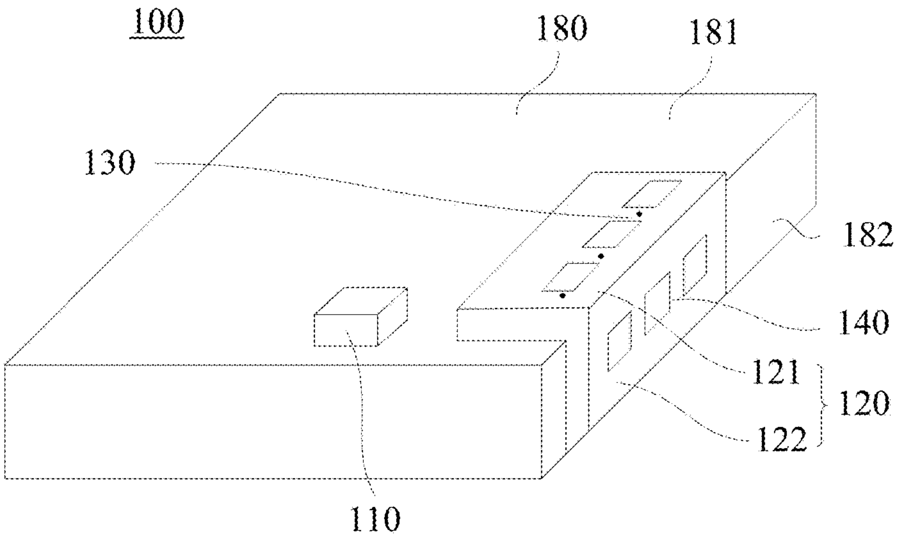
FIG. 9 is a fourth structural schematic view of an antenna apparatus provided by an embodiment of the present disclosure.
Figure 10:
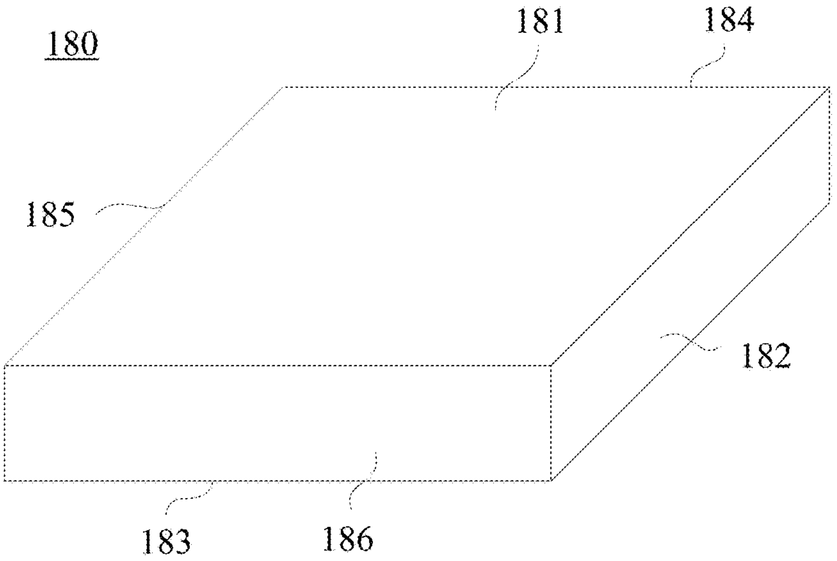
FIG. 10 is a schematic structural view of a mainboard shown in FIG. 9.
Figure 11:
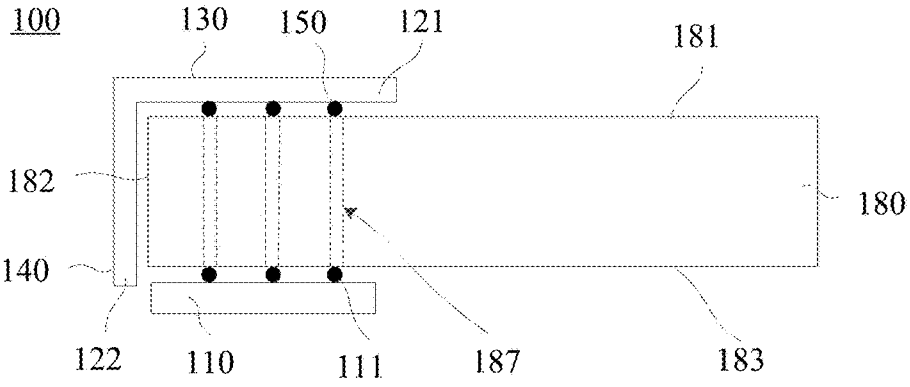
FIG. 11 is a fifth structural schematic view of an antenna apparatus provided by an embodiment of the present disclosure.

As shown in FIG. 9 and FIG. 10, FIG. 9 is a fourth structural schematic view of an antenna apparatus provided by an embodiment of the present disclosure, FIG. 10 is a structural schematic view of a mainboard shown in FIG. 9. The antenna apparatus 100 may also include a motherboard 180.

As shown in FIG. 10, the mainboard 180 may include a first surface 181 and a third surface 183 arranged oppositely, as well as a second surface 182, a fourth surface 184, and a fifth surface disposed between the first surface 181 and the third surface 183. Extending directions of the second surface 182, the fourth surface 184, the fifth surface 185 and the sixth surface 186 may intersect with the extending directions of the first surface 181 and the third surface 183, such that the second surface 182, the fourth surface 184, the fifth surface 185 and the sixth surface 186 are not coplanar with the first surface 181 and the third surface 183.

The second surface 182, the fourth surface 184, the fifth surface 185 and the sixth surface 186 may be directly or indirectly connected to the first surface 181 and the third surface 183. In this case, the mainboard 180 may be a rectangular thin plate.

The mainboard 180 may also be a structure of other shapes, such as but not limited to a prism, a pentagon, a hexagon, a polygon, etc. The mainboard 180 may also include more surfaces, such as a seventh surface, an eighth surface, etc. The present disclosure does not limit the specific structure of the mainboard 180.

The mainboard 180 may carry the dielectric substrate 120 and the antenna array. The mainboard 180 may be, but is not limited to, at least part of the carrier board of the middle frame 300 of the electronic device 10, at least part of the antenna bracket of the electronic device 10, or at least a portion of the circuit board 400 of the electronic device 10. For example, the circuit board 400 of the electronic device 10 may include the mainboard 180 of the antenna apparatus 100.

The embodiments of the present disclosure do not limit the specific structure of the mainboard 180, and any structure that may carry the dielectric substrate 120 and the antenna array is within the protection scope of the embodiments of the present disclosure.

As shown in FIG. 9, the first surface 181 and the second surface 182 of the mainboard 180 are connected to each other, and the extension direction of the second surface 182 may intersect with the extension direction of the first surface 181. Thus, the first sub-substrate 121 of the dielectric substrate 120 may be connected to the first surface 181 of the mainboard 180. For example, a lower surface of the first sub-substrate 121 may be attached to and connected to the first surface 181; the second sub-substrate 122 of the dielectric substrate 120 may be connected to the mainboard 180. For example, an inner surface of the second sub-substrate 122, may be attached to and connected to the second surface 182.

When the dielectric substrate 120 also includes one or more third sub-substrates 123, each third sub-substrate 123 may be connected to other suitable surfaces of the mainboard 180 that are different from the first surface 181 and the second surface 182. For example, the third sub-substrate 123 may be connected to the fourth surface 184, the fifth surface 185, the sixth surface 186 . . . .

The extension direction of the surface connected to the third sub-substrate 123 of the mainboard 180 may intersect with the extension directions of the first surface 181 and the second surface 182, such that when the third array antenna 170 is disposed on the third sub-substrate 123, the radiation direction of the third antenna array 170 is different from the radiation directions of the first antenna array 130 and the second antenna array 140.

In the antenna apparatus 100 of the embodiments of the present disclosure, the first antenna array 130 is connected to the first surface 181 of the mainboard 180 through the first sub-substrate 121, and the second antenna array 140 is connected to the second surface 182 of the mainboard 180 through the second sub-substrate 122. A size of the first antenna array 130 and the second antenna array 140 in a thickness direction of the mainboard 180 is small, which may reduce a cross-sectional height of the antenna apparatus 100 and achieve miniaturization of the antenna apparatus 100. Moreover, due to the size of the surface 182 of the mainboard 180 in the thickness direction of the mainboard 180 is small, it is difficult to fix the antenna radiator on the second surface 182. However, in the embodiments of the present disclosure, the second sub-substrate 122 and the first sub-substrate 121 are connected to each other, such that the second sub-substrate 122 may be connected to the second surface 182 of the mainboard 180 through the second sub-substrate 122 and the first sub-substrate 121, which may reduce installation difficulty of the second antenna array 140.

Based on the structure of the antenna apparatus 100 described above, as shown in FIG. 11, which is a schematic structural view of a fifth antenna apparatus provided by an embodiment of the present disclosure. The first antenna array 130 and the feed point 150 may be connected to the first surface 181 of the mainboard 180 through the first sub-substrate 121. The feed source 110 may be disposed on the third surface 183 of the mainboard 180. The feed source 110 and the first antenna array 130 may be arranged on opposite surfaces of the mainboard 180.

As shown in FIG. 10, the motherboard 180 may also be provided with a metal plated hole 187 penetrating the first surface 181 and the third surface 183. Metal plating operation may be performed on a wall of the metal plated hole 187, such that the feed point 150 on the first surface may be electrically connected to the feed source 110 on the third surface 183 through the hole wall of the metal plated hole 187, thereby realizing electrical connection between the feed source 110 and the first antenna array 130 and the second antenna array 140.

The feed source 110 may also be coupling fed with the first antenna array 130 through the metal plated hole 187.

Thus, the feed source 110 and the first antenna array 130 may be coupling fed without using physical electrical devices.

The feed 110 may be disposed directly opposite the first antenna array 130 such that the metal plated hole 187 may pass vertically along the thickness direction of the mainboard 180.

A number of metal plated hole 187 may not be less than a number of the feed point 150, and each feed point 150 may be electrically connected to the feed source 110 through one metal plated hole 187.

The antenna apparatus 100 may also include a feed terminal 111 electrically connected to the feed source 110. The feed terminal 111 may be disposed on the third surface 183 of the mainboard 180. A number of the feed terminals 111 may be the same as that of the feed point 150 and that of the metal plated hole 187, and multiple feed terminals 111 correspond to multiple metal plated holes 187 and multiple feed points 150 in one-to-one correspondence. An end of the metal plated hole 187 may be electrically connected to the feed point 150, and another end of the metal plated hole 187 may be electrically connected to the feed terminal 111. Therefore, the first antenna array 130 may be electrically connected to the feed source 110 through the feed point 150, the metal plated hole 187 and the feed terminal 111.

In the antenna apparatus 100 of the embodiments of the present disclosure, the feed 110 and the first antenna array 130 are disposed on different surfaces of the mainboard 180. The first antenna array 130 may be disposed directly opposite the feed source 110, and direct or indirect connection may be realized through the metal plated hole 187. Therefore, the difficulty of electrical connection between the first antenna array 130 and the feed source 110 may be reduced, and the number of wirings required for electrical connection between the two may be reduced.

Figure 12:
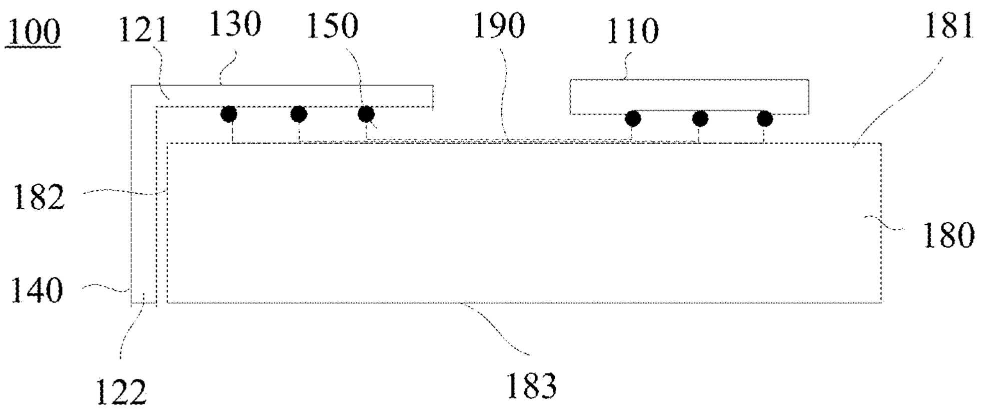
FIG. 12 is a sixth schematic structural view of an antenna apparatus provided by an embodiment of the present disclosure.

As shown in FIG. 12, which is a sixth structural schematic view of an antenna apparatus provided by an embodiment of the present disclosure. The first antenna array 130, the feed point 150 and the feed source 110 may all be connected to the first surface 181 of the mainboard 180. The feed source 110 and the first antenna array 130 may be disposed on the same surface of the mainboard 180.

The first antenna array 130 and the feed source 110 may be arranged at intervals, such that the first antenna array 130 and the feed source 110 may be connected to different areas of the first surface 181 of the mainboard 180.

As shown in FIG. 12, the antenna apparatus 100 may further include a second feed network 190, and at least part of the second feed network 190 may be disposed on the first surface 181. An end of the second feed network 190 may be electrically connected to the feed point 150, and another end of the second feed network 190 may be electrically connected to the feed terminal 111, such that the feed point 150 may achieve electrical connection with the feed source 110 through the second feed network 190.

Figure 13:
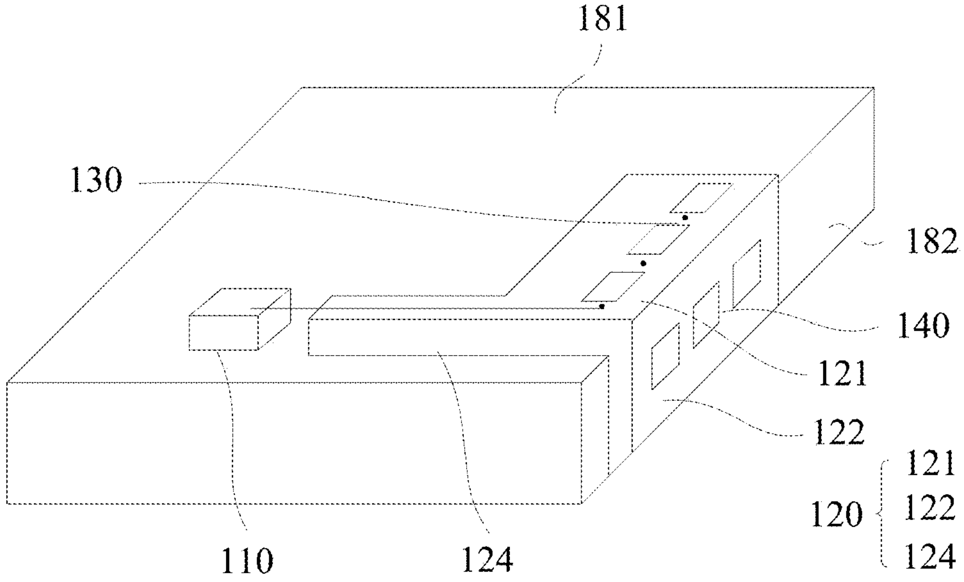
FIG. 13 is a seventh structural schematic view of an antenna apparatus provided by an embodiment of the present disclosure.

As shown in FIG. 13, which is a seventh structural schematic view of the antenna apparatus provided by an embodiment of the present disclosure, when the first antenna array 130 and the feed source 110 are connected to the same surface of the mainboard 180 and a distance between the feed source 110 and the first antenna array 130 is relatively far, the dielectric substrate 120 may also include an extension sub-substrate 124.

The extension sub-substrate 124 may be connected to the first sub-substrate 121 and extend in a direction toward the feed source 110. The extension sub-substrate 124 and the first sub-substrate 121 may be located on a same side of the second sub-substrate 122. The extension sub-substrate 124 may be connected to the first surface 181 of the mainboard 180, for example, a lower surface of the extension sub-substrate 124 may be attached to the first surface 181.

The extension sub-substrate 124 may be a flexible feed board, and the feed point 150 of the first antenna array 130 may be electrically connected to the feed source 110 through the extension sub-substrate 124.

The extension sub-substrate 124 may also serve as a carrier of the feed network. At least part of the second feed network 190 may be located on both the first sub-substrate 121 and the extension sub-substrate 124. The second feed network 190 may be electrically connected to the feed source 110 through the extension sub-substrate 124.

In the antenna apparatus 100 according to the embodiments of the present disclosure, the feed 110 and the first antenna array 130 are disposed on the same surface of the mainboard 180. The size of the antenna apparatus 100 in the thickness direction is smaller, which facilitates miniaturization of the antenna apparatus 100.

In addition to being disposed on the first surface 181 or the third surface 183 of the mainboard 180, the feed source 110 may also be disposed on the dielectric substrate 120, for example, on the first sub-substrate 121 of the dielectric substrate 120. In this case, the antenna apparatus 100 may further include a third feed network (not shown in the drawings). The third feed network may be disposed inside the first sub-substrate 121. The third feed network may be connected to the first antenna array 130 disposed on the first sub-substrate 121 and the feed 110. The second antenna array 140 may also be electrically connected to the feed source 110 through the third feed network.

The feed source 110 may also be disposed on other areas of the dielectric substrate 120, such as the second sub-substrate 122 and the third sub-substrate 123. The embodiments of the present disclosure do not specify the specific position of the feed source 110.

In addition to being electrically connected through the above-mentioned metal plated hole 187 and the second feed network 190, the feed source 110 and the feed point 150 may also be electrically connected through hot-pressed tin welding or board-to-board connectors and other methods to achieve electrical connection, which will not be described again here.

Based on the antenna apparatus 100 of the above embodiments, the dielectric substrate 120 may include a flexible material substrate. For example, the first sub-substrate 121 of the dielectric substrate 120 may include a first flexible layer, and the second sub-substrate 122 of the dielectric substrate 120 may include a second flexible layer. When the feed source 110 is disposed on the first sub-substrate 121, the feed source 110 may be disposed on the first flexible layer.

A surface of the first flexible layer may be connected to the first surface 181, and the first antenna array 130 may be provided on another surface of the first flexible layer. A surface of the second flexible layer may be connected to the second surface 182, the second antenna array 140 may be provided on another surface of the second flexible layer.

The second flexible layer may be connected to the first flexible layer. For example, the first flexible layer and the second flexible layer may be integrally formed and connected, such that the dielectric substrate 120 may be a flexible substrate, so as to facilitate connection with the first surface 181 and second surface 182 of the mainboard 180.

Figure 14:
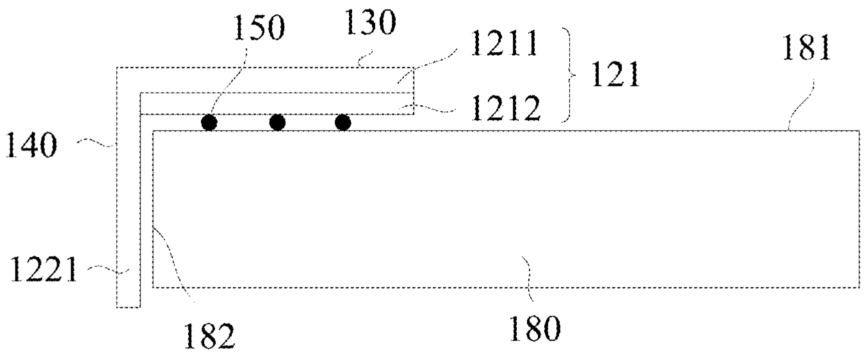
FIG. 14 is an eighth schematic structural view of an antenna apparatus provided by an embodiment of the present disclosure.

The dielectric substrate 120 may also include flexible materials and rigid materials together. For example, as shown in FIG. 14, which is an eighth schematic structural view of an antenna apparatus according to an embodiment of the present disclosure. The first sub-substrate 121 of the dielectric substrate 120 may include a base layer 1212 and a first flexible layer 1211 stacked together, and the second sub-substrate 122 may include a second flexible layer 1221.

The hardness of the base layer 1212 may be greater than the hardness of the first flexible layer 1211. The base layer 1212 may be connected to the first surface 181, and the first antenna array 130 may be disposed on a surface of the first flexible layer 1211 away from the base layer 1212. The second antenna array 140 may be disposed on a surface of the second flexible layer 1221 away from the mainboard 180. The second flexible layer 1221 is connected to the second surface 182, and the second flexible layer 1221 may be connected to the first flexible layer 1211.

When the feed source 110 is disposed on the first sub-substrate 121, the feed source 110 may be disposed on the first flexible layer 1211 or the base layer 1212.

In the antenna apparatus 100 of the embodiments of the present disclosure, the first sub-substrate 121 includes the rigid base layer 1212 and the first flexible layer 1211. On the one hand, the base layer 1212 may carry the first flexible layer 1211, which may increase the hardness of the first sub-substrate 121. On the other hand, the rigid base layer 1212 is easier to be fixed and connected to the mainboard 180, which may increase connection stability of the dielectric substrate 120.

Figure 15:
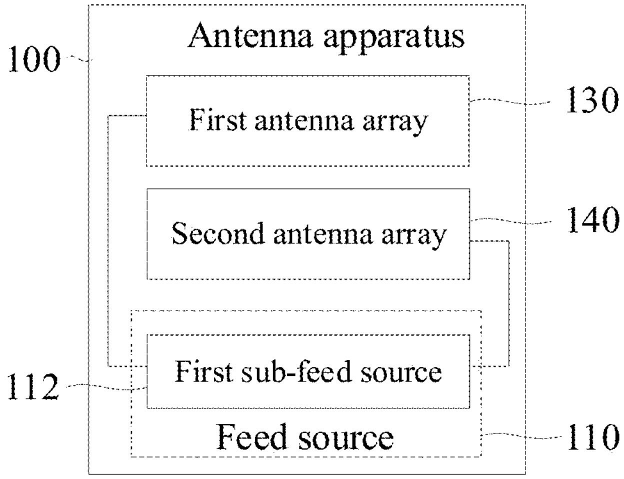
FIG. 15 is a ninth structural schematic view of an antenna apparatus provided by an embodiment of the present disclosure.

As shown in FIG. 15, which is a ninth structural schematic view of an antenna apparatus provided by an embodiment of the present disclosure. The feed source 110 may include a first sub-feed source 112, and the first sub-feed source 112 may be electrically connected to the first antenna array 130 directly or indirectly, such that the first antenna array 130 may transmit the first wireless signal. The first sub-feed 112 may also be electrically connected with the second antenna array 140 directly or indirectly, such that the second antenna array 140 may transmit the second wireless signal.

The first sub-feed source 112 may provide an excitation signal to the first antenna array 130 and the second antenna array 140 simultaneously. The excitation signal may excite the first antenna array 130 to transmit the first wireless signal and excite the second antenna array 140 to transmit the second wireless signal.

The first wireless signal and the second wireless signal may be wireless signals in the same frequency band, but have different radiation directions. The first wireless signal and the second wireless signal may also be wireless signals with different frequency bands and different radiation directions. The embodiments of the present disclosure do not limit the specific frequency bands of the first wireless signal and the second wireless signal.

In the antenna apparatus 100 of the embodiment of the present disclosure, the feed source 110 only includes the first sub-feed source 112. The first sub-feed source 112 may provide the excitation signal to the first antenna array 130 and the second antenna array 140 simultaneously, such that the feed source 110 may realize a small size.

Figure 16:
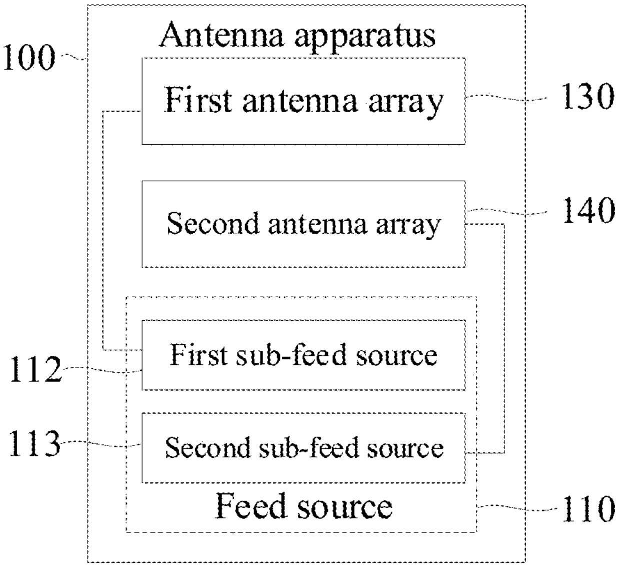
FIG. 16 is a tenth schematic structural view of an antenna apparatus provided by an embodiment of the present disclosure.

As shown in FIG. 16, which is a tenth schematic structural view of an antenna apparatus provided by an embodiment of the present disclosure. The feed source 110 may include a first sub-feed source 112 and a second sub-feed source 113. The first sub-feed source 112 may be directly or indirectly electrically connected to the first antenna array 130, such that the first antenna array 130 may transmit the first wireless signal. The second sub-feed source 113 may be directly or indirectly electrically connected to the second antenna array 140, or the second sub-feed source 113 may be coupled to the second antenna array 140 such that the second antenna array 140 may transmit the second wireless signal.

The first sub-feed source 112 and the second sub-feed source 113 may provide the excitation signal in different frequency bands, such that the frequency bands of the first wireless signal and the second wireless signal are different. The first sub-feed source 112 and the second sub-feed source 113 may also provide the excitation signal of the same frequency band, such that the frequency band of the first wireless signal and the second wireless signal is the same.

In the antenna apparatus 100 of the embodiments of the present disclosure, the feed source 110 includes the first sub-feed source 112 and the second sub-feed source 113. The first sub-feed source 112 may independently provide the excitation signal to the first antenna array 130, and the second sub-feed source 113 may provide the excitation signal to the first antenna array 130. The source 113 may provide the excitation signal to the second antenna array 140 separately, thereby facilitating independent tuning of the first antenna array 130 and the second antenna array 140.

The electronic device 10 may include a radio frequency transceiver module (not shown in the drawings) that provides and transmits the excitation signal. The radio frequency transceiver module may be, but is not limited to, disposed on the circuit board 400 of the electronic device 10. The radio frequency transceiver module may include the above-mentioned feed source 110. The first antenna array 130 and the second antenna array 140 of the antenna apparatus 100 may be electrically connected to the transceiver module of the device to transmit the first wireless signal and the second wireless signal.

In the description of the present disclosure, terms such as "first" and "second" are only configured to distinguish similar objects, and may not be understood as indicating or implying relative importance or implicitly indicating the number of indicated technological features.

The antenna apparatus and electronic device provided by the embodiments of the present disclosure have been introduced in detail above. The present disclosure uses specific examples to illustrate the principles and implementation methods of the present disclosure. The description of the above embodiments is only used to help understand the present disclosure. Besides, for those skilled in the art, there will be changes in the specific implementation and application scope based on the ideas of the present disclosure. In summary, the content of this description should not be understood as a limitation of the present disclosure.

What is claimed is:

1. An antenna apparatus, comprising:

a dielectric substrate, comprising a first sub-substrate and a second sub-substrate connected to each other, wherein an extension direction of the second sub-substrate intersects with an extension direction of the first sub-substrate;

a first antenna array, arranged on the first sub-substrate, wherein a feed point is provided on the first antenna array, the feed point is configured to be electrically connected with a feed source, and the first antenna array has a first radiation direction; and a second antenna array, arranged on the second sub-substrate, wherein the second antenna array has a second radiation direction, and the second radiation direction is different from the first radiation direction;

wherein the antenna apparatus further comprises: a mainboard, wherein the mainboard comprises a first surface and a second surface connected to each other, an extension direction of the second surface intersects with an extension direction of the first surface, the first sub-substrate is connected to the first surface, and the second sub-substrate is connected to the second surface; and wherein the mainboard further comprises a third surface opposite to the first surface, the feed source is disposed on the third surface, the mainboard further comprises a metal plated hole penetrating the first surface and the third surface, and the feed source is electrically connected to the feed point through the metal plated hole; or wherein the feed source is provided on the first surface, and antenna apparatus further comprises: a conductive connector, wherein at least a part of the conductive connector is provided on the first surface, and the feed point is electrically connected to the feed source through the conductive connector, and the first sub-substrate and the feed source are arranged at intervals on the first surface.

2. The antenna apparatus according to claim 1, wherein the dielectric substrate further comprises:

one or more third sub-substrates, wherein an extension direction of each third sub-substrate intersects with the extension directions of the first sub-substrate and the second sub-substrate; and the antenna apparatus further comprises:

a third antenna array, wherein a number of the third antenna array is not greater than a number of the one or more third sub-substrates, and each third antenna array is disposed on one of the one or more third sub-substrates.

3. The antenna apparatus according to claim 1, wherein the second antenna array is electrically connected to the feed source through the feed point.

4. The antenna apparatus according to claim 1, wherein the feed source is provided on the first surface, and the dielectric substrate further comprises:

an extension sub-substrate, connected to the first surface, connected to the first sub-substrate and extending in a direction toward the feed source, wherein the feed point is electrically connected to the feed source through the extension sub-substrate.

5. The antenna apparatus according to claim 1, wherein the feed source comprises:

a first sub-feed source, electrically connected to the first antenna array, allowing the first antenna array to transmit a first wireless signal; and a second sub-feed source, electrically connected or coupled with the second antenna array, allowing the second antenna array to transmit a second wireless signal.

6. The antenna apparatus according to claim 1, wherein the first sub-substrate comprises a first flexible layer, the first antenna array is disposed on the first flexible layer, the second sub-substrate comprises a second flexible layer connected to the first flexible layer, and the second antenna array is disposed on the second flexible layer.

7. The antenna apparatus according to claim 1, wherein the first sub-substrate comprises a base layer and a first flexible layer stacked together, the first antenna array is disposed on the first flexible layer, the second sub-substrate comprises a second flexible layer connected to the first flexible layer, and the second antenna array is disposed on the second flexible layer.

8. An electronic device, comprising an antenna apparatus, wherein the antenna apparatus comprises:

a dielectric substrate, comprising a first sub-substrate and a second sub-substrate connected to each other, wherein an extension direction of the second sub-substrate intersects with an extension direction of the first sub-substrate;

a first antenna array, arranged on the first sub-substrate, wherein a feed point is provided on the first antenna array, the feed point is configured to electrically connect with a feed source, and the first antenna array has a first radiation direction; and a second antenna array, arranged on the second sub-substrate, wherein the second antenna array has a second radiation direction, and the second radiation direction is different from the first radiation direction;

wherein the antenna apparatus further comprises: a mainboard, wherein the mainboard comprises a first surface and a second surface connected to each other, an extension direction of the second surface intersects with an extension direction of the first surface, the first sub-substrate is connected to the first surface, and the second sub-substrate is connected to the second surface; and wherein the mainboard further comprises a third surface opposite to the first surface, the feed source is disposed on the third surface, the mainboard further comprises a metal plated hole penetrating the first surface and the third surface, and the feed source is electrically connected to the feed point through the metal plated hole; or wherein the feed source is provided on the first surface, and antenna apparatus further comprises: a conductive connector, wherein at least a part of the conductive connector is provided on the first surface, and the feed point is electrically connected to the feed source through the conductive connector, and the first sub-substrate and the feed source are arranged at intervals on the first surface.

9. The electronic device according to claim 8, wherein the electronic device further comprises:

a radio frequency transceiver module, comprising the feed source of the antenna apparatus.

10. The electronic device of claim 8, wherein the dielectric substrate further comprises:

one or more third sub-substrates, an extension direction of each third sub-substrate intersects with the extension directions of the first sub-substrate and the second sub-substrate; and the antenna apparatus further comprises a third antenna array, a number of the third antenna array is not greater than a number of the one or more third sub-substrates, and each third antenna array is disposed on the one or more of the third sub-substrates.

11. The electronic device according to claim 8, wherein the feed source is provided on the first surface, and the dielectric substrate further comprises:

an extension sub-substrate, connected to the first surface, connected to the first sub-substrate and extending in a direction toward the feed source, wherein the feed point is electrically connected to the first surface through the extension sub-substrate.

12. An electronic device, comprising an antenna apparatus and a circuit board; wherein the antenna apparatus comprises:

a dielectric substrate, comprising a first sub-substrate and a second sub-substrate connected to each other, wherein an extension direction of the second sub-substrate intersects with an extension direction of the first sub-substrate;

a first antenna array, arranged on the first sub-substrate, wherein a feed point is provided on the first antenna array, the feed point is configured to electrically connect with a feed source, and the first antenna array has a first radiation direction; and a second antenna array, arranged on the second sub-substrate, wherein the second antenna array has a second radiation direction, and the second radiation direction is different from the first radiation direction; and wherein the circuit board comprises a first surface and a second surface connected to each other, an extension direction of the second surface intersects with an extension direction of the first surface, the first sub-substrate is connected to the first surface, and the second sub-substrate is connected to the second surface;

wherein the circuit board further comprises a third surface opposite to the first surface, the feed source is disposed on the third surface, the circuit board further comprises a metal plated hole penetrating the first surface and the third surface, and the feed source is electrically connected to the feed point through the metal plated hole; or wherein the feed source is provided on the first surface, and antenna apparatus further comprises: a conductive connector, wherein at least a part of the conductive connector is provided on the first surface, and the feed point is electrically connected to the feed source through the conductive connector, and the first sub-substrate and the feed source are arranged at intervals on the first surface.

* * * * *